United States Patent

[11] 3,616,462

[72] Inventors Arthur E. Gurgiolo;
 Robert W. McAda, both of Lake Jackson, Tex.
[21] Appl. No. 394,301
[22] Filed Sept. 3, 1964
[45] Patented Oct. 26, 1971
[73] Assignee The Dow Chemical Company
 Midland, Mich.

[54] ALLYL GLYCIDYL ETHERS
 11 Claims, No Drawings
[52] U.S. Cl. ................................................. 260/348,
  260/88.3, 260/79.5
[51] Int. Cl. ................................................. C07d 1/18,
  C08g 23/06
[50] Field of Search ........................................... 260/348

[56] References Cited
UNITED STATES PATENTS

| | | | |
|---|---|---|---|
| 2,599,817 | 6/1952 | Evans et al. ................... | 260/348 |
| 2,949,474 | 2/1960 | Murdoch et al. ............. | 260/348 |
| 2,986,570 | 5/1961 | Monroe et al. ............... | 260/348 |
| 3,102,893 | 9/1963 | Gaertner ....................... | 260/348 |
| 3,217,015 | 11/1965 | Nummy ........................ | 260/348 |
| 3,268,561 | 8/1966 | Peppel et al. ................. | 260/348 |

*Primary Examiner*—Norma S. Milestone
*Attorneys*—Griswold & Burdick and C. E. Rehberg

ABSTRACT: Vulcanizable, rubbery copolymers of propylene oxide are made by the copolymerization of propylene oxide with a glycidyl ether containing an allylic terminal group. At least one oxyalkylene or thioalkylene group intervenes between the glycidyl group and the allylic group of the comonomer.

ALLYL GLYCIDYL ETHERS

This invention relates to diethers of alkylene glycols and polyoxyalkylene glycols wherein one terminal group is an allyl ether group and the other is a glycidyl ether group. Such compounds have the formula $$CH_2=CHCH-(XCH_2CHR)_n-X-CH_2-CH-CH_2$$
$$|\qquad\qquad\qquad\qquad\qquad\qquad\backslash O /$$
$$(CH_2)_m-H$$

wherein $m$ is an integer from 0 to 5, $n$ is an integer from 1 to 40, $R$ is a radical selected from the group consisting of $H$, alkyl radicals having one to five carbon atoms, phenyl, benzyl, haloalkyl radicals containing one to five carbon atoms and one to two halogen atoms of atomic number 17 to 35, allyloxyalkyl radicals containing one to three carbons in the alkyl portion thereof and $X$ is a chalcogen having an atomic number 8 to 16; i.e., oxygen or sulfur.

While other syntheses are obvious, the preferred method for making the compounds of the invention comprises (1) condensing $n$ moles of 1 or more alkylene oxides or sulfides, $$CH_2-CHR$$
$$\backslash X /$$

with the allylic alcohol or thiol $$CH_2=CH-CHXH$$
$$|$$
$$(CH_2)_m-H$$

and then (2) making the glycidyl ether or thioether of the resulting compound by reaction with epichlorohydrin and alkali. These two steps, individually, are well known and are easily adapted to the production of any particular product of the present invention. A particularly preferred synthesis consisted essentially of using $BF_3$ etherate as the catalyst in the first step of the above process and NaOH the second step. In the second step, the initial quantity of $BF_3$ is adequate to cause the initial reaction of epichlorohydrin, thus producing the 3-chloro-2-hydroxypropyl ether. To convert this to the glycidyl ether requires at least about a stoichiometric amount of alkali.

The preparation of some typical products of the invention is illustrated by the following examples.

EXAMPLE 1 a. 2-Allyloxyethanol was made by placing 16 moles of allyl alcohol and 5 cc. of $BF_3$ etherate in a reactor that was open to the atmosphere through a dry-ice-cooled reflux condenser. Over a period of 1 hour there was gradually added, with stirring, 8 moles of ethylene oxide, the temperature being held at 70°–75° C. The mixture was digested for an additional hour at 70°–75°, after which the catalyst was neutralized with 5 cc. of 50 percent NaOH and the excess allyl alcohol was distilled off under vacuum. The product (579 g.) had $n_D^{25.5}=1.4370$.

b. A mixture of 5.5 m. of the above allyloxy-ethanol and 2 cc. of $BF_3$ etherate was reacted as in (a) with an equimolar amount of epichlorohydrin, the digestion at 70°–75° being continued for 2 hours. The catalyst was neutralized with 2 cc. of 50 percent NaOH and the excess epichlorohydrin was flashed off under vacuum (<5 mm.) at 55° C. Then 5.5 m. of 50 percent NaOH was added at 40°–50° C. Over a period of 1 hour and the mixture was digested at that temperature for 2 hours. The product was decanted, neutralized with 0.1 N HCl, filtered, and distilled (b.p., 42° C. at 0.07 mm.). It was a clear, colorless liquid having $n_D^{25}=1.4431$. Analysis showed for allyloxyethyl glycidyl ether:

|  | Found | Calculated |
|---|---|---|
| Oxirane Oxygen | 9.6 | 10.1 |
| C=C | 15.5 | 15.2 |

EXAMPLES 2–27

By substituting the appropriate reactants using essentially the procedure of example 1, the products shown in table 1 were made. In most cases the epoxides or episulfides were reacted in sequence to produce block copolymers containing the indicated number of units in each block. Example 20 illustrates a random copolymer made by mixing the butylene oxide and epichlorohydrin before reaction with the allyl alcohol. The following abbreviations are used in the table:

EO=the oxyethylene group
PO=the 1,2-oxypropylene group
BO=the 1,2-oxybutylene group
SO=the 1phenyl-2-oxyethylene group (derived from styrene oxide)
Epi=the 3-chloro-1,2-oxypropylene group (derived from epichlorohydrin)
G=the glycidyl group
AGE=the 3-allyloxy-1,2-oxypropylene group (derived from allyl glycidyl ether)
A=the allyloxy group
MA=the alpha-methylallyloxy group
PS=the 1,2-thiopropylene group (derived from propylene sulfide)
Epi Br=the 3-bromo-1,2-oxypropylene group (derived from epibromohydrin)
BGE=the 3-n-butoxy-1,2-oxypropylene group (derived from n-butyl glycidyl ether)
PGE=the 3-phenoxy-1,2-oxypropylene group (derived from phenyl glycidyl ether)

Thus, for example, the formula for the compound of example 2 is while that of the compound of example 25 is $$CH_2=CHCH_2O-[CH_2CH(C_2H_5)O]_5-[CH_2CH(CH_3)O]_5-$$
$$-[CH_2CHO-]_2-CH_2CHO-CH_2CH-CH_2$$
$$|\qquad\qquad|\qquad\qquad\backslash O /$$
$$CH_2Cl$$
$$CH_2OCH_2CH=CH_2$$

TABLE I.—ALLYLIC ETHERS

| Example Number | Compound | Molecular weight | $n_D^{25}$ | Oxirane oxygen Calculated | Oxirane oxygen Found | C=C Calculated | C=C Found | Viscosity, 100° F. centistokes |
|---|---|---|---|---|---|---|---|---|
| 2 | A-PO-G | 172 | 1.4405 | 9.3 | 8.8 | 14.0 | 13.1 | |
| 3 | A-BO-G | 186 | 1.4406 | 8.6 | 8.2 | 12.9 | 12.0 | |
| 4 | A-SO-G | 234 | 1.4777 | 6.8 | 4.0 | 10.3 | 6.7 | 7.2 |
| 5 | A-Epi-G | 206 | 1.4772 | 7.8 | 3.6 | 11.7 | 9.7 | 9.8 |
| 6 | A-(EO)₁₅-G | 774 | 1.4635 | 2.1 | 2.1 | 3.1 | 3.6 | 38 |
| 7 | A-(EO)₃₀-G | 1,434 | | 1.1 | 1.1 | 1.7 | 1.9 | |
| 8 | A-(PO)₂₀-G | 1,274 | 1.4498 | 1.3 | 0.7 | 1.9 | 2.1 | 6.4 |
| 9 | MA-PO-G | 186 | 1.4360 | 8.6 | 6.3 | 12.9 | 12.5 | 2.6 |
| 10 | A-(Epi)₅-G | 574 | 1.4983 | 2.8 | 1.2 | 4.2 | 3.7 | 218 |
| 11 | A-(Epi)₁₀-G | 1,034 | 1.5044 | 1.5 | 0.6 | 2.3 | 2.4 | 980 |
| 12 | A-EO-PO-G | 216 | 1.4528 | 7.4 | 5.1 | 11.1 | 9.1 | 4.8 |
| 13 | A-EO-(PO)₄-G | 390 | 1.4484 | 4.1 | 4.0 | 6.2 | 7.8 | 17.1 |
| 14 | A-(EO)₁₅-G | 1,644 | 1.4542 | 1.0 | 0.9 | 1.5 | 4.2 | 41 |
| 15 | A-PO-Epi-G | 264 | 1.4685 | 6.1 | 2.9 | 9.1 | 7.8 | 11 |
| 16 | A-PO-(Epi)₂-G | 356 | 1.4763 | 4.5 | 2.0 | 6.7 | 6.1 | 25 |
| 17 | A-(PO)₂-(Epi)₅-G | 690 | 1.4862 | 2.3 | 1.1 | 3.5 | 3.6 | 126 |
| 18 | A-(Epi)₅-(PO)₅-G | 936 | 1.4685 | 1.7 | 0.8 | 2.6 | 3.1 | 175 |
| 19 | A-(BO)₅-(Epi)₄-G | 844 | 1.4648 | 1.9 | 1.4 | 2.9 | 3.3 | 32 |
| 20 | A-[(BO)₅+(Epi)₅]-G | 889 | 1.4652 | 1.8 | 1.0 | 2.7 | 3.2 | 53 |

TABLE I.—ALLYLIC ETHERS

| Example Number | Compound | Molecular weight | $n_D^{25}$ | Oxirane oxygen | | C=C | | Viscosity, 100° F. centistokes |
|---|---|---|---|---|---|---|---|---|
| | | | | Calculated | Found | Calculated | Found | |
| 21 | A-BO-Epi-AGE-G | 392 | 1.4715 | 6.1 | 4.9 | 4.1 | 2.0 | 24 |
| 22 | A-EO-PO-AGE-G | 330 | 1.4606 | 4.8 | 3.3 | 14.5 | 13.0 | 10 |
| 23 | A-EO-PS-PO-G | 290 | 1.5000 | 0 | | 8.3 | | 70 |
| 24 | A-EO-Epi-Br-G | 295 | 1.5143 | 5.5 | 4.1 | 8.1 | 11.1 | 13 |
| 25 | A-(BO)₅-(PO)₅-(AGE)₂-Epi-G | 1,084 | 1.4460 | 1.5 | 1.0 | 4.4 | 5.5 | 48 |
| 26 | A-PO-Epi-BGE-G | 394 | ¹1.4623 | 4.1 | 2.5 | 6.1 | 5.8 | 14 |
| 27 | A-PO-Epi-PGE-G | 414 | ¹1.4947 | 3.9 | 2.7 | 5.8 | 15.8 | 31 |

¹ At 20° C.

All the above products were clear liquids except those containing long polyoxyethylene chains such as the product of example 7, which are waxy, low-melting solids. In general, they have low volatility and are not dangerous or objectionable to handle.

The above compounds of the invention have two independent polymerizable groups in the molecule: (1) the epoxy group in the terminal glycidyl ether groups and (2) the allylic double bond in the terminal allyloxy groups. Each of these is normally reactive and can be independently polymerized and copolymerized by the methods and catalysts known to be effective for the polymerization of the simple olefin oxides and glycidyl ethers on the one hand the allyl ethers on the other. Thus, the compounds can be polymerized, or copolymerized with other polymerizable vinyl monomers, to produce polymers or copolymers containing a multiplicity of epoxy groups. These polymers and copolymers are then a class of uncured epoxy resins and can be cured by the known methods of curing epoxy resins. Alternatively, the compounds of the invention can be polymerized, or copolymerized with other epoxides, to produce polymers or copolymers containing a multiplicity of allyl radicals. These unsaturated polymers can then be cured by the methods used to cure unsaturated polymers such as natural and most synthetic rubbers and elastomers.

A particularly valuable use for the compounds of the invention is in the production of vulcanizable elastomers by copolymerizing them with propylene oxide. Such copolymers have a polyoxyalkylene "backbone" or main chain having, at random intervals thereon, side chains terminating with allyl groups. The latter, by virtue of their reactive double bond, render the copolymers vulcanizable by any of the various agents and techniques known to be useful for vulcanizing natural rubber or the various unsaturated synthetic rubbers.

For the production of the above elastomers, ordinarily a weight ratio of propylene oxide (PO) to the allylic ether of the present invention (hereinafter referred to generically as "allyl ether") of about 97:3 to 80:20 is used. Less than about 3 percent of the allyl ether provides too little unsaturation for tight vulcanization while more than 20 percent provides no additional benefit and is wasteful.

While allyl glycidyl ether has been copolymerized with alkylene oxide and the copolymer then vulcanized (U.S. Pat. No. 3,031,439, Can. Chem. Proc., 47, No. 8, 41 (1963)) it has the undesirable properties of being volatile, toxic and irritating. Also, the product thus made is inferior to that of the present invention in several critical physical and chemical properties. Thus, its solvent resistance, and particularly its oil resistance, is notably inferior to that of the product of the present invention.

Vinyl glycidyl ethers of glycols are known and have been copolymerized with other vinyl monomers but not with alkylene oxides (U.S. Pat. No. 2,949,474). The high reactivity of vinyl derivatives as compared to allyl derivatives is well known.

Vulcanizable elastomeric copolymers of propylene oxide and the allyl ethers of the invention can be made by copolymerizing a mixture of the monomers by any of the known techniques and catalysts which will produce solid polymers of propylene oxide. Such techniques and catalysts are disclosed, for instance, in U.S. Pat. Nos. 2,706,181–2, 2,706,189, 2,844,454, 2,861,962, 2,873,258, 2,911,377, 2,933,459, 3,016,394 and 3,100,750, in British patents 937,164 and 941,959 and in Canadian patents 662,242 and 662,246. The resulting copolymers are polyethers having a side chain corresponding to each molecule of the allyl ether in the polymer, each such side chain being terminated with an allyl radical. By virtue of the unsaturation in these allyl radicals, these copolymers can be vulcanized by any of the techniques and vulcanizing agents known to be effective in other unsaturated elastomers, such as natural rubber and the synthetic rubbers based on copolymers of butadiene, chloroprene, isoprene and other conjugated diolefins.

The preparation of vulcanizable copolymers is illustrated by the following example.

EXAMPLE 1A

A pressure reactor was charged with 180 g. of propylene oxide, 20 g. of allyloxyethyl glycidyl ether (compound of example 1), 8 g. of a hydrolyzed iron alkoxide catalyst prepared as disclosed in U.S. Pat. No. 2,873,258 and 1 g. of 2,6-di-tert.-butyl-o-cresol. The reactor was flushed with nitrogen, sealed, and heated at 80° C. for 72 hours. The copolymer thus produced in quantitative yield was a firm, brown, rubbery solid.

Copolymers of propylene oxide with 4–30 percent of the allylic ethers of examples 1–27 were made substantially as described above. All were physically similar to that described above.

The above copolymers were compounded and vulcanized by use of typical formulations and procedures of the rubber art. The following is a typical example of a suitable procedure.

The copolymer described above was compounded and vulcanized as follows:

Recipe Parts by Weight

| | |
|---|---|
| Copolymer | 100 |
| Phenyl-62-Naphthylamine | 2 |
| Stearic acid | 2 |
| Zinc oxide | 10 |
| Carbon black (Super Processing Furnace, No. 65, United Carbon Co.) | 35 |
| Sulfur (No. 30–1, Stauffer Chemical Co.) | 5 |
| Tetramethylthiuram disulfide (Methyl Tuads, R.T. Vanderbilt Co.) | 2 |
| 2-Mercaptobenzothiazole (Captax, R.T. Vanderbilt Co.) | 2 |

The copolymer was placed on a water-cooled roll mill, the amine, stearic acid and zinc oxide were added together, then the carbon black and finally, the sulfur, Tuads and Captax were added together, milling was continued for 5 minutes with frequent cutting to assure complete mixing.

The compounded copolymer was cured in a 4×5×0.065-inch mold at 320° F. under a ram force of 30,000 pound. Optimum cure was usually obtained in about 30 minutes. All the copolymers produced rubbery, elastic, vulcanized products. Some of these were then tested by standard procedures to determine tensile strength, ultimate elongation, hardness and oil resistance. Strength and elongation were measured with a Tinius-Olsen machine, hardness with a Shore A tester, and oil resistance by ASTM D-471-55T, using No. 2 oil. Results of these tests are shown in table II. Example numbers correspond to those in table I wherein the allylic ether used is described; e.g., the ether of example 2 was used in example 2A. In each example the indicated ether was copolymerized with propylene oxide in the indicated percentage, based on the weight of copolymer. The copolymer was then compounded as described above, except as noted, and cured at 320° F., as described above, for the indicated time.

TABLE II.—COPOLYMERS MADE WITH IRON CATALYSTS

| Example | Percent allylic ether | Cure time, minutes | Cured rubber | | | |
|---|---|---|---|---|---|---|
| | | | Tensile, p.s.i. | Elongation, percent | Hardness, Shore A | Oil swell, volume, percent |
| 1A | 5 | 30 | 1,950 | 400 | 80 | (b) |
| B[a] | 10 | 20 | 1,030 | 490 | 80 | 19.1 |
| | | 30 | 1,210 | 485 | 75 | 12.5 |
| 2A | 4 | 30 | 515 | 300 | | 9.2 |
| B | 8 | 30 | 1,115 | 375 | | 9.2 |
| C | 15 | 40 | 825 | 380 | | 6.1 |
| 3A | 5 | 30 | 1,100 | 315 | 74 | 15.8 |
| 4A | 6 | 30 | 730 | 310 | | |
| 5A | 10 | 30 | 429 | 270 | 68 | |
| 13A | 8 | 30 | 615 | 280 | 75 | |
| 17A | 13 | 30 | | | | 3.0 |
| 21A | 10 | 30 | 370 | 100 | 83 | |
| 22A | 8 | 30 | 500 | 130 | 82 | 15.8 |
| 24A | 7.5 | 30 | 620 | 275 | | |

[a] No di-tert.butylcresol was used in the copolymerization formulation.
[b] Wherever blanks occur, no tests were run.

While the iron catalysts used in making the copolymers shown in the above examples are convenient and economical, polymers of higher molecular weights and correspondingly higher tensile strengths are obtained with some of the metal alkyls; e.g., zinc alkyls. These, however, suffer the disadvantage that the catalysts are more expensive and the yields are often lower.

In the following examples, which illustrate the use of partially hydrolyzed zinc alkyl catalysts, 200 g. of propylene oxide, the indicated amount of allylic ether identified by the corresponding example number in table I (e.g., in example 10 B, C, D, etc., the allylic ether was that of example 10, table I), 60 cc. of a 15 percent solution of zinc diethyl in hexane and 0.9 cc. of water were placed in a closed reactor, flushed with nitrogen and gently agitated for 68 hours at 25° C. The products were tough, rubbery, milky white solids. These copolymers were then compounded and cured as described above for the previous examples. The cured products were considerably stronger and tougher than those prepared with the iron catalysts. Results are shown in table III.

TABLE III.—COPOLYMERS MADE WITH ZINC CATALYSTS

| Example | Percent allylic ether | Yield, percent | Cure time, minutes | Cured rubber | |
|---|---|---|---|---|---|
| | | | | Tensile, p.s.i. | Elongation percent |
| 1C | 3.7 | 100 | 30 | 2,750 | 750 |
| | Same | | 40 | 2,750 | 745 |
| 1D | 5.2 | 69 | 30 | 4,450 | 610 |
| | Same | | 40 | 2,990 | 550 |
| 2D | 3.7 | 87 | 30 | 2,450 | 750 |
| | Same | | 40 | 2,990 | 750 |
| 3B | 3.7 | 92 | 30 | 2,780 | 725 |
| | Same | | 40 | 3,050 | 740 |

We claim:
1. An allylic compound having the formula

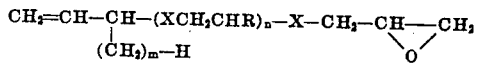

wherein $m$ is an integer from 0 to 5, $n$ is an integer from 1 to 40, R is a member selected from the group consisting of H, alkyl of one to five carbon atoms, phenyl, halomethyl with halogen of atomic number 17 to 35, allyloxy-, alkoxy- and phenoxymethyl, and X is a chalcogen having an atomic number 8 to 16.

2. A compound as defined in claim 1 wherein R is H and X is 0.
3. A compound as defined in claim 2 wherein $m$ is zero.
4. A compound as defined in claim 1 wherein R is alkyl and X is 0.
5. A compound as defined in claim 4 wherein R is $CH_3$.
6. A compound as defined in claim 1 wherein R is $CH_2Cl$ and X is 0.
7. The compound defined in claim 3 wherein $n$ is 1.
8. The compound defined in claim 5 wherein $m$ is zero and $n$ is 1.
9. The compound defined in claim 6 wherein $m$ is zero and $n$ is 1.
10. The compound defined in claim 1 wherein $m$ is zero, $n$ is 1, R is phenyl and X is 0.
11. The compound having the formula

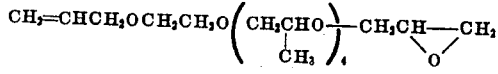

PO-1050
(5/69)

UNITED STATES PATENT OFFICE
CERTIFICATE OF CORRECTION

Patent No. 3,616,462          Dated 26 October 1971

Inventor(s) Arthur E. Gurgiolo and Robert W. McAda

It is certified that error appears in the above-identified patent and that said Letters Patent are hereby corrected as shown below:

In column 2, line 10, delete "42°C" and insert -- 43°C --; at line 50 insert the formula:

In column 4, line 51 (second line in first column of chart), delete "Phenyl-62-Naphthylamine" and insert -- Phenyl-β-Napthylamine --.

Signed and sealed this 13th day of June 1972.

(SEAL)
Attest:

EDWARD M. FLETCHER, JR.           ROBERT GOTTSCHALK
Attesting Officer                     Commissioner of Patents